A. B. NORRIS.
WORK HOLDING DEVICE.
APPLICATION FILED OCT. 17, 1914.

1,201,612.

Patented Oct. 17, 1916.
5 SHEETS—SHEET 4.

A. B. NORRIS.
WORK HOLDING DEVICE.
APPLICATION FILED OCT. 17, 1914.

1,201,612.

Patented Oct. 17, 1916.
5 SHEETS—SHEET 5.

Witnesses:

Inventor:
Arthur B. Norris
By Dyrenforth, Lee, Chritton & Wiles
Attys

UNITED STATES PATENT OFFICE.

ARTHUR B. NORRIS, OF ROCHESTER, NEW YORK, ASSIGNOR TO CHARLES E. REED & CO., OF CHICAGO, ILLINOIS, A CORPORATION OF ILLINOIS.

WORK-HOLDING DEVICE.

1,201,612.  Specification of Letters Patent.  Patented Oct. 17, 1916.

Original application filed July 17, 1914, Serial No. 851,595. Divided and this application filed October 17, 1914. Serial No. 867,130.

*To all whom it may concern:*

Be it known that I, ARTHUR B. NORRIS, a citizen of the United States, residing at 710 Ellwanger and Barry Building, Rochester, in the county of Monroe and State of New York, have invented new and useful Improvements in Work-Holding Devices, of which the following is a specification.

My invention relates more particularly to work-holding devices for supporting, in position to be operated upon by tracer and cutting elements, a pattern and the work to be operated on, I having devised my improvements for use more particularly in wood-working machines for shaping the heel and toe portions of lasts, a machine of this type and the one in connection with which I have chosen to illustrate my improvements being illustrated and described in my pending application for U. S. Letters Patent Serial No. 851,595, filed July 17, 1914, the present application being a division of said pending application.

My primary objects, generally stated, are to provide improvements in work-holding devices to the end of rendering them adjustable for reversing the ends of the work to permit the cutters to operate on both ends of the lasts without readjusting them on the holder, adjustable for varying the throw of the holder in reversing it, and adjustable for work of different sizes; to provide improved clamping means for securing the work against movement on the work-holder; and generally, to so improve work-holding devices as hitherto constructed that they will operate to effectually perform the functions intended to be performed thereby, and especially when used for holding lasts, for permitting the cutters to produce lasts of the desired form and dimensions.

Referring to the accompanying drawings: Fig. 6ª is a section taken at the line 6ª on Fig. 6 and viewed in the direction of the arrow.

In the construction of machine illustrated my improved work-holding means are carried on the forward ends of brackets 20 spaced apart in a horizontal plane and connected with a vertically movable slide 21 guidedly supported on a stationary upright frame member 22 of the machine, the slide 21 being adapted to be raised by hand and descend by gravity at a rate of speed controlled by the action of hydraulic means for positioning the work to be operated on and the pattern in the proper positions relative to the cutters and pattern-tracer, respectively, and feed the work thereto by moving the work downwardly in a direction away from the cutters and pattern-tracer. The pattern-tracer and cutters are represented at 24 and 25, respectively, these devices being operatively connected together in such manner and associated with other parts of the machine that the pattern-tracer is caused to automatically rotate about the uppermost end of the pattern, whether it be the toe or heel portion, and produce a corresponding movement of the cutters whereby, as the work-holding slide 21 is lowered, in the operation of the machine, the cutters are caused to rotate in a path corresponding with the path in which the pattern-tracer rotates, thereby causing the cutters to shape the ends of the lasts in conformance with the shape of the end of the pattern being operated on. As the general features of this machine do not form the subject of my present application, but are clearly disclosed in my said pending application, the foregoing general description of the machine, it is believed, will suffice to render clear a manner in which my improved work-holding device may be utilized.

Figure 1:
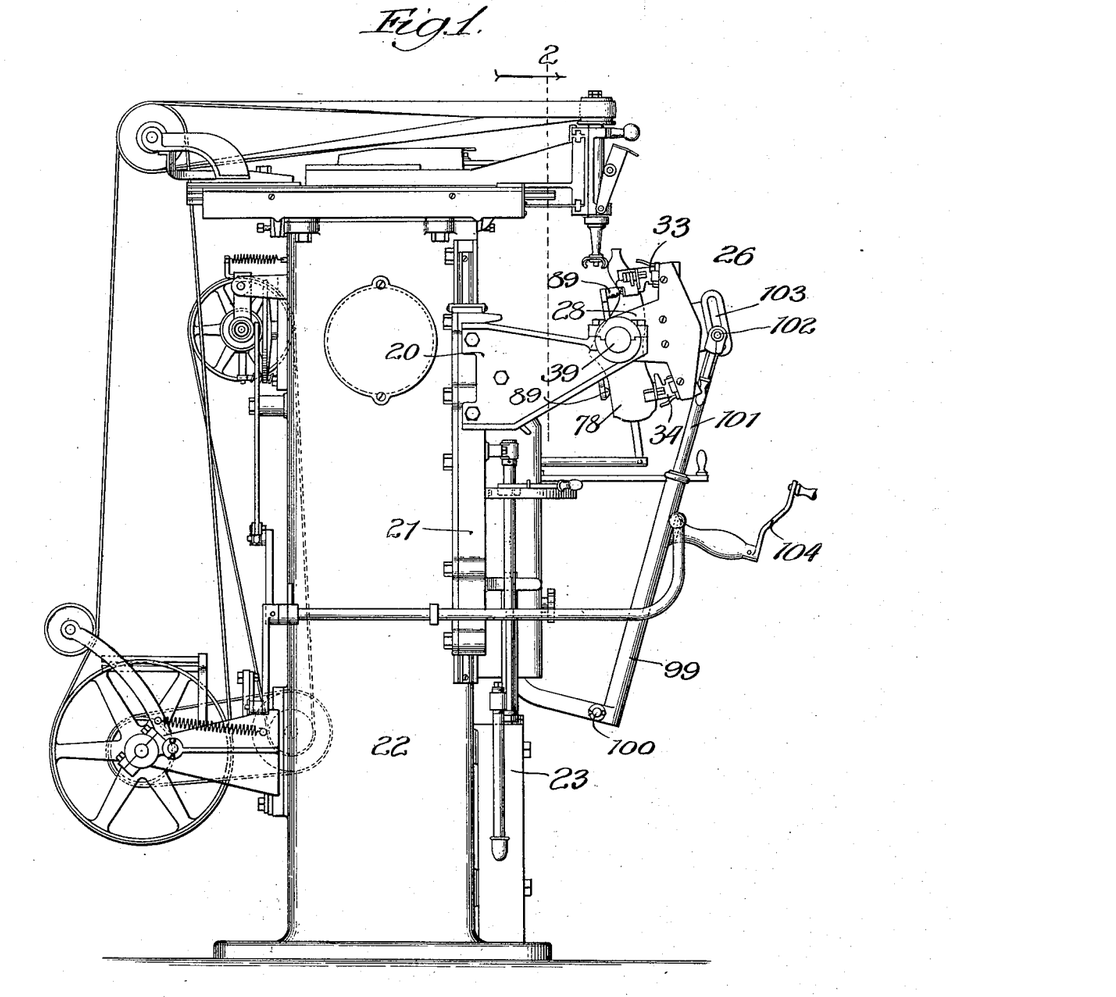
Figure 1 is a view in side elevation of a shaping-machine of the construction illustrated and described in my said pending application for shaping the heel and toe portions of lasts, said machine being provided with work-holding devices embodying my invention.
Figure 2:
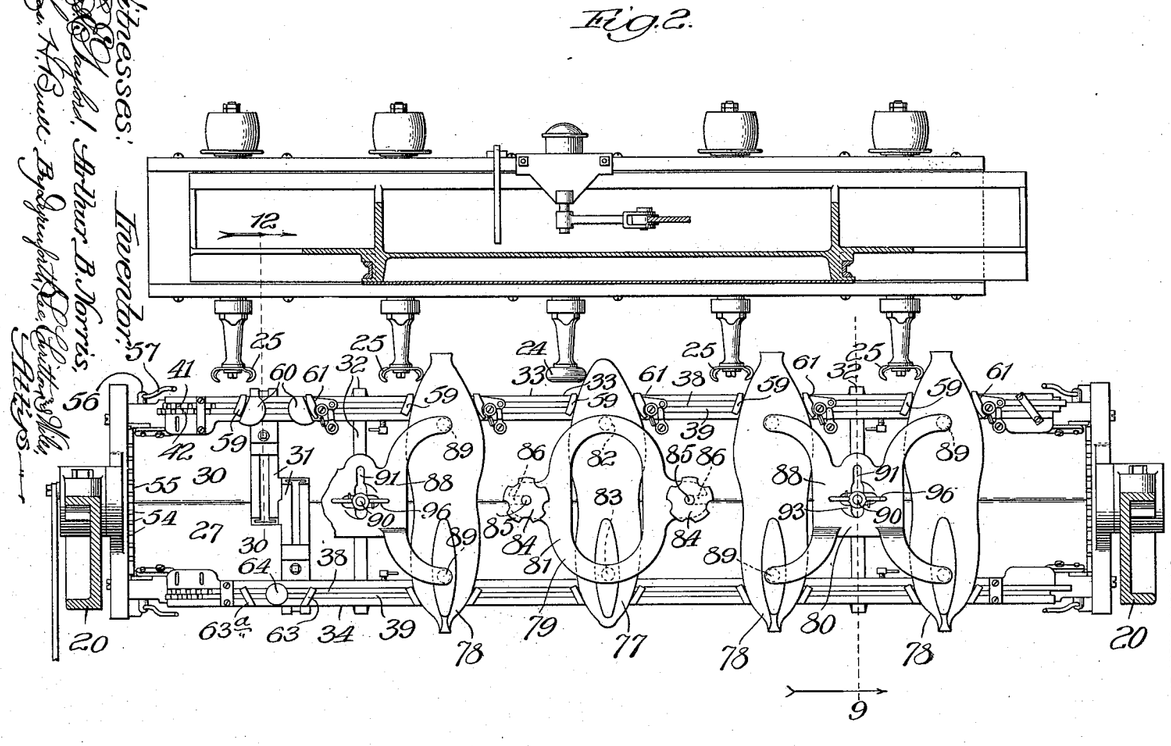
Fig. 2 is an enlarged section taken at the line 2 on Fig. 1 and viewed in the direction of the arrow, showing my improved work-holding device in elevation with a pattern and three lasts secured in position thereon to coöperate with the pattern-tracer and cutters, respectively, one last being omitted and the adjacent portion of a clamp therefor broken away to disclose a detail.
Figures 9, 10, 11, 12, 13:
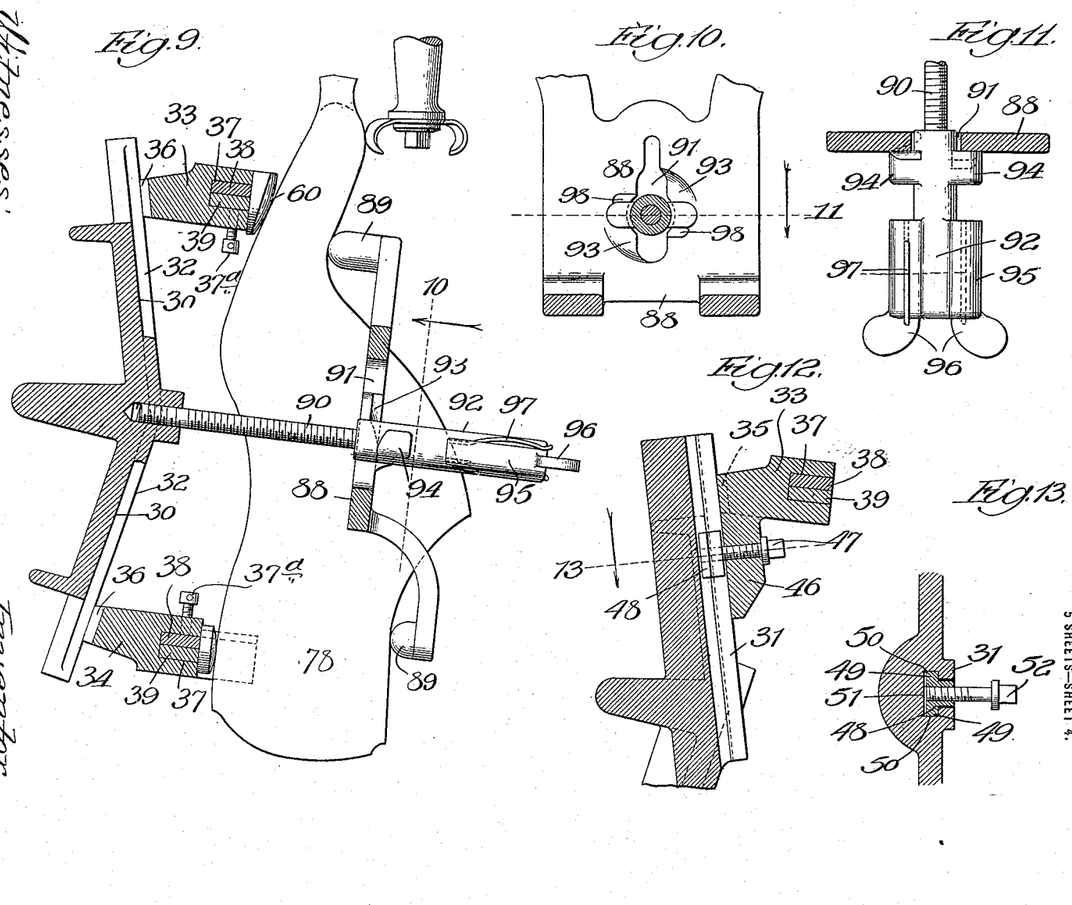
Fig. 9 is a section taken at the line 9 on Fig. 2, and viewed in the direction of the arrow, showing the work-holder and the manner of clamping a piece of work in position thereon.
Fig. 10 is a broken sectional view taken at the line 10 on Fig. 9, and viewed in the direction of the arrow.
Fig. 11 is a section taken at the line 11 on Fig. 10, and viewed in the direction of the arrow.
Fig. 12 is a broken section taken at the line 12 on Fig. 2, and viewed in the direction of the arrow.
Fig. 13 is a section taken at the line 13 on Fig. 12, and viewed in the direction of the arrow.
Figure 14:
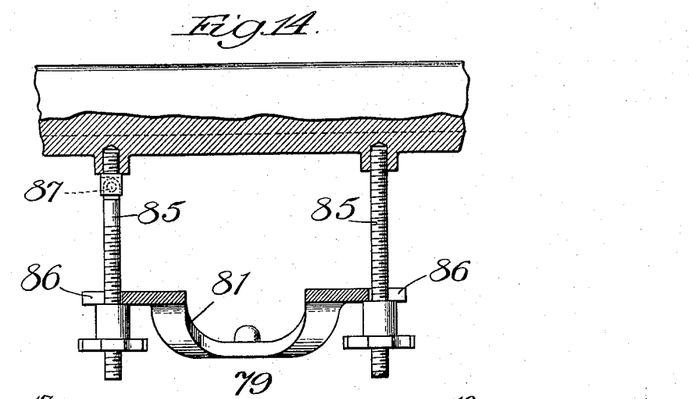
Fig. 14 is a view partly in elevation and partly sectional of the pattern-clamping device.

The preferred form of work-holder, represented at 26, is formed of a plate 27 extending across the front of the machine and provided with arms 28 at angles thereto, carrying trunnions 39 journaled in the forward ends of the brackets 20. The inner face of the plate 27 is formed with converging surfaces 30, (Figs. 2 and 9), provided at intervals with transversely disposed ribs 31 and 32 alternating with each other. The ribs 31 are provided in pairs arranged in staggered over-lapping position, as shown of the pair at the extreme left-hand side in Fig. 2; in the construction shown there being three of the ribs 31 and two pairs of the ribs 32. At the upper and lower edges of the plate 27 I provide members 33 and 34 adjustable toward and away from each other on this plate, each being formed on its rear face with lugs 35 and 36, at which these bars bear against the ribs 31 and 32, respectively, and containing in its front side a longitudinally-extending channel 37 in which bars 38 and 39 are independently slidable, straps 40 on the members 33 and 34 preventing displacement of the bars 38 and 39. The bars 38 and 39 contain notches 41 and 42, respectively, at their adjacent ends to receive a key, such as that represented at 43 and provided with pins 44, one of these pins coöperating with one of these notches and the other with a slot 45 in the channeled member containing these bars, for adjusting the latter bars relative to each other upon rotating the key, for the purpose hereinafter explained.

The members 33 and 34 are provided at intervals on their rear sides with feet 46 carrying clamping devices 47 for securing the members 33 and 34 to the plate 27 in adjusted position, these clamp-devices comprising blocks 48 having flanges 49 which enter the end-cut portions 50 of grooves 51 in the ribs 31 and cap-screws 52 passing through the feet 46 and screwing into the blocks 48. The ends of the members 33 and 34 are provided with catches 53 adapted in adjusting said members, to enter notches 54 on ribs 55 on the inner faces of the arms 28. These catches are preferably in the form of fingers 53 secured on the ends of rock-shafts 56 journaled in the ends of the channeled bars 33 and 34 and having actuating levers 57, stationary plates 58 secured to the bars 33 and 34 confining the fingers 53. From the foregoing description it will be understood that the members 33 and 34 are adjustable toward and away from each other along the converging ribs 31 and 32 and are adapted to be rigidly secured thereon in adjusted position.

The bar 38 of the member 33 carries at intervals lugs 59 and bearing-blocks 60 which coöperate with pivotally-supported devices 61 and bearing-blocks 62 secured to the bar 39 of the member 33, these parts being provided for engagement with the edges and bottom-surfaces of the toe-portions of the lasts and pattern. The bar 38 of the member 34 is provided at intervals with lugs 63 and the bar 39 of this member with lugs 63ª, the member 34 carrying bearing-blocks 64 with relation to which the lugs 63 and 63ª are adjustable by adjusting the bars 38 and 39 carrying them. The lugs 59 and devices 61 are disposed alternately and the lugs 63 and 63ª are similarly arranged, there being a pair of the bearing-blocks 60 and 62 between each pair of lugs 59 and devices 61 and one bearing-block 64 between each pair of lugs 63 and 63ª. The lugs 59 and devices 61 are adapted to gage the toe-portions of the lasts and patterns on the work-holder with these portions of the lasts and pattern bearing against the blocks 60 and 64, and the lugs 63 and 63ª adapted to gage the heel-portions of the lasts and pattern upon the work-holder with the bottoms of the lasts and pattern resting against the blocks 64. The sets of lugs 63 and 63ª are preferably arranged in converging position, as shown, their inner-opposed surfaces being inclined, as represented at 65 and 66, to cause them to bear against those portions of the lasts which are the most uniform. It will be understood from the foregoing that by shifting the bars 38 and 39 lengthwise of each other in the channel 37, as stated, the co-operating clamping elements described are likewise shifted adapting the work-holder for supporting lasts and patterns of different widths, the above described connections of the members 33 and 34 with the plate 27 permitting of the adjustment of these members toward and away from each other to accommodate lasts and patterns of different lengths.

Provision of the gaging-devices on the bars 38 and 39 as described, causes each set of devices to become simultaneously adjusted upon shifting these bars, for gaging all of the lasts and pattern. The devices 61 are preferably each formed of a block 67 (Fig. 7) with a curved inner face, pivoted on a pin 68 carried by the bar 39 of the member 33 and pivotally connected at 69 with a toggle formed of a link 70 pivoted at 71 to a crank 72 on a shaft 73 fixed in a plate 74 secured to the bar 39 and carrying a finger-grip 75 for actuating the crank 72, these parts being so arranged that when the block 67 is swung into engagement with the edge of the last or pattern the toggle-joint 70 will extend beyond the line connecting the points 69 and 73, for holding the crank 72 in place, a spring 76 operating to hold the toggle in position beyond dead-center in clamping position and movable when the toggle is thrown in the opposite direction to a position in which it does not oppose the last-referred to movement of the toggle.

In the drawings the pattern is represented at 77 and the lasts to be operated on at 78 (Fig. 2), the pattern and lasts being held against the bearing-blocks 60, 62 and 64 by means of clamps 79 and 80, respectively. The clamp 79 is formed of an apertured plate 81 provided with studs 82 and 83 on its rear side adapted to bear against the top of the pattern, and clamp-nuts 84 screwing upon threaded studs 85 on the plate 27 at opposite sides of the pattern 77 and passing through slots 86 in the plate 81, the nuts bearing against the face of the latter. One of the studs 85 is formed of sections pivotally connected together at 87 to permit the clamp 79 to be readily applied to clamping position. The clamps 80, one provided for each pair of lasts 78, are each formed of a spider-plate 88 carrying studs 89, one pair thereof at each side of the plate 88 for engagement with the tops of the lasts, a threaded stud 90 secured to, and projecting outwardly from, the plate 27 intermediate each pair of lasts 78 and extending through an opening 91 in the plate 88, and a clamping sleeve 92 screwing upon the outer threaded end of the stud 90. The opening 91 is preferably elongated and extends lengthwise of the plate 88 and is provided on its outer face at opposite sides of the opening 91 with cam-surfaces 93 which are engaged by lugs 94 on the sleeve 92 and operates to force the plate 88 into rigid clamping engagement with the lasts when the sleeve 92 is turned to the right on the stud 90, the outer end of the sleeve 92 being provided with a head 95 equipped with wings 96 for facilitating the turning of the sleeve. The lugs 94, head 95 and openings 91 are so proportioned that the lugs and head will pass therethrough upon applying the plate 88 to the lasts, these lugs being spaced from the head 95 a distance greater than the thickness of the plate 88 to avoid the necessity for removal of this plate from the stud 90 in preliminarily adjusting the plate 88, or sleeve 92, on the stud for different sizes of lasts, the operator merely moving the plate 88 to a position in which it will extend opposite the space between the lugs 94 and the head 95, and after the desired adjustment of the sleeve 92 on the stud 90 has been effected, re-positioning the plate 88 beyond the lugs 94 for engagement of the latter with the cam-surfaces 93. To prevent the plate 88 from dropping off the stud 90 during reversal of the work-holder and to hold the plate 88 in raised position during the removal of the lasts on the holder and application of different lasts to the latter, I provide a spring 97 on the head 95 which frictionally engages the wall of the opening 91, this spring permitting the operator to pull the plate 88 up on the sleeve 92, but preventing it from falling off the latter by its own weight; and to prevent undue rotation of the sleeve 92 on the plate 88 I provide lugs 98 on the latter at opposite sides of the opening 91.

Figures 3, 4, 5, 6, 6A, 7, 8:
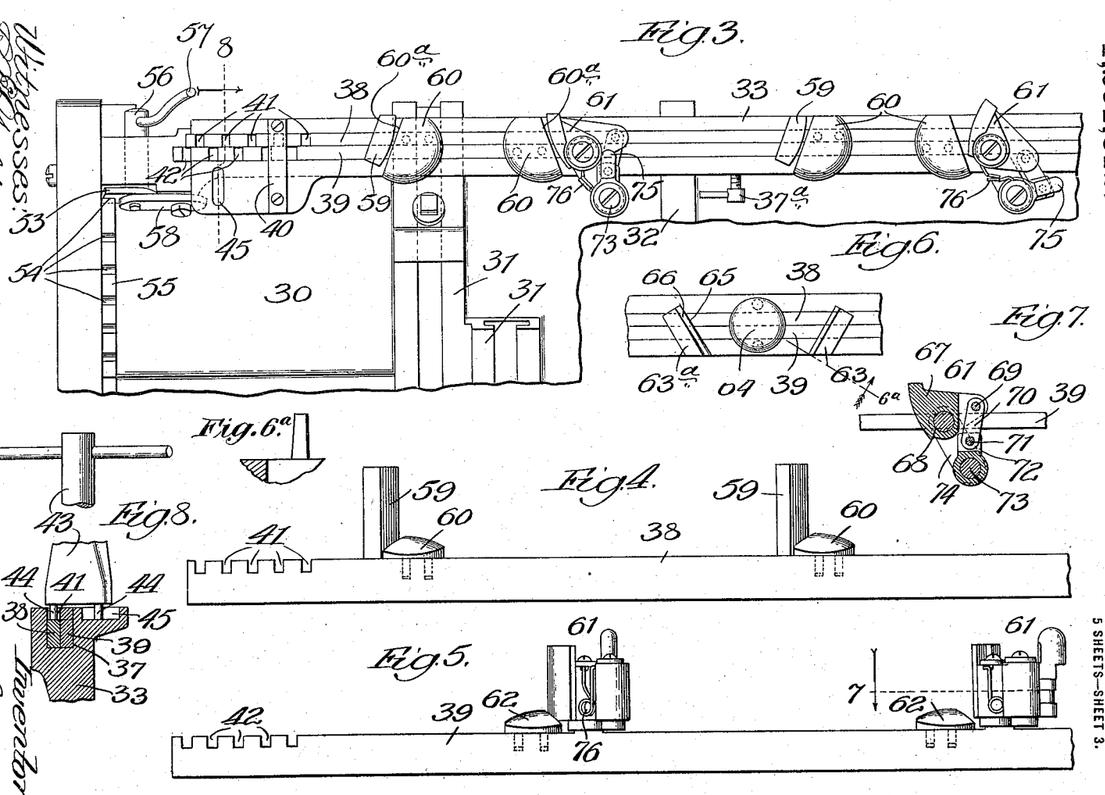
Fig. 3 is a face view of a portion of one end of the work-holder.
Fig. 4 is a face view of one of the adjustable bars carrying clamp-devices for the lasts and model, or pattern.
Fig. 5 is a similar view of the other adjustable bar coöperating with the bar of Fig. 4.
Fig. 6 is a broken face view of the edge of the work-holder opposite to that shown in Fig. 3.
Fig. 7 is a section taken at the line 7 on Fig. 5, and viewed in the direction of the arrow, this view showing the detail of one of the plurality of similar devices on the work-holder, for holding the work and pattern in place.
Fig. 8 is a section taken at the line 8 on Fig. 3, and viewed in the direction of the arrow, with a key shown in elevation and in position for adjusting the bars of Figs. 4 and 5 relative to each other.

In the use of the work-holder, the pattern 77 and lasts 78 from which the stubs on the toe and heel portions thereof are to be removed in the case of the particular machine illustrated, are applied to the reversible work-holder in the position shown in Fig. 8 (wherein one of the lasts 78 is omitted) to extend in upright position parallel to each other, the lasts and pattern being clamped to the work-holder to rest at the toe and heel portions thereof against the bearing-blocks 60, 62 and 64, respectively, by means of the lugs 59, 63 and 63ª, movable blocks 67 and the clamping devices 79 and 80. The operator in clamping the lasts and pattern to the work-holder may shift the members 33 and 34 toward or away from each other to cause the clamping lugs and blocks just referred to, to engage the edges of the heel and toe portions of the lasts and pattern at the desired points, this feature adapting the work-holder to support lasts and patterns of different lengths, the provision plate 27 with its inclined surfaces 30 operating to cause the lasts and patterns, regardless of their size, to extend medially in alinement with the trunnions on which the work-holder is mounted, in order that the patterns and lasts, regardless of their size, shall be substantially centrally positioned relative to the coöperating pattern-tracer and respective rotary cutters. In the clamping operation described, the operator, by using the key 43, as hereinbefore described, shifts the bars 38 and 39 in the channels 37 to adjust the lugs and blocks carried thereby for rigidly engaging the edges of the toe and heel portions of the lasts and pattern, the clamping members of which the blocks 67 are parts, being swung by the operator to the position illustrated in Fig. 7 and in the left-hand side of Fig. 3, the construction of these devices, as hereinbefore described, permitting of the firm clamping of the lasts and patterns at their edges, even should they vary slightly in width. After adjusting the bars 38 and 39, as stated, the operator, by tightening set-screws 37ª screwing into the channel bars 33 and 34 and against one of the bars in the channel 37, rigidly clamps these adjustable bars in their position. The clamping devices 79 and 80 are then applied to the pattern 77 and lasts 78, respectively, as hereinbefore described.

Figure 15:
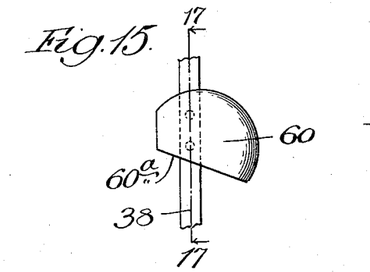
Fig. 15 is a plan view of one of the similar toe-blocks of Fig. 3.
Figure 16:
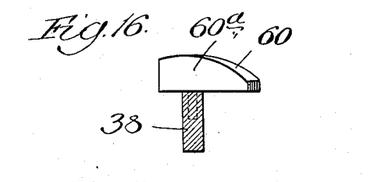
Fig. 16 is an edge view thereof.
Figure 17:
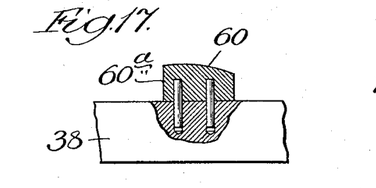
Fig. 17 is a view in elevation, partly sectional, of the toe-blocks of the preceding figures and the bar carrying it, the section being taken at the line 17 on Fig. 15, and viewed in the direction of the arrow.

As hereinbefore described, the work-holder is reversible on the trunnions 29 to present either ends of the lasts and pattern to the cutters and tracer respectively. Any suitable means may be employed for holding the work-holder in either of its said positions of adjustment upon its trunnions, the means employed in the machine illustrated involving, generally stated, a hollow member 99 pivoted at its lower end as indicated at 100 to a stationary part of the machine, a rod 101 sliding in the member 99 and pivotally connected at its upper end as indicated at 102 to an extension of 103 on the work-holder, and an operating handle 104 operatively connected with rack and pinion mechanism, not shown, in the member 99 and interposed between the handle 104 and rod 101 and operating upon actuating the handle 104, as set forth in my said pending application, to swing the work-holder through approximately 180° and lock it in position. The upper surfaces of the bearing-blocks 60 and 62 are preferably of spherical contour, as shown in Figs. 15, 16 and 17, with the highest points located preferably close to the upper ends of the blocks in Fig. 3 and at the edges thereof adjacent to the lugs 59 and 67, respectively, where the blocks are cut away, as shown at 60ª and 62ª. The shaping of these blocks, as stated, serves to cause the lasts to bear against them close to the lugs 59 and 67 and the blocks to present such bearing surfaces that the lasts, regardless of their shapes and sizes, will seat firmly thereon.

Figure 18:
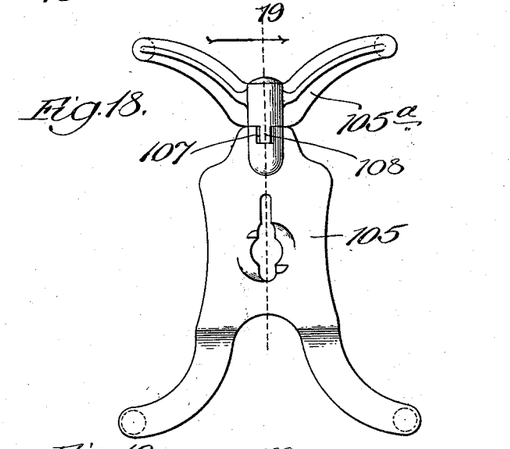
Fig. 18 is a plan view of another form of work-clamp-plate.
Figure 19:
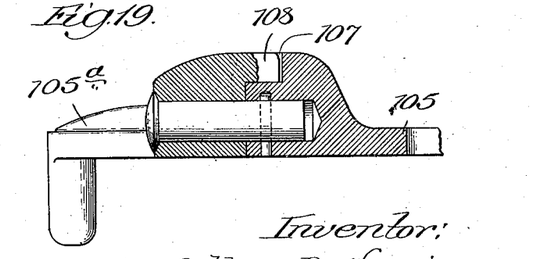
Fig. 19, a section taken at the line 19 on Fig. 18, and viewed in the direction of the arrow.

Referring to Figs. 18 and 19, these views show a modification of the last-clamps of the preceding figures, wherein the clamp in this case, instead of being formed as a rigid structure, is formed of two main sections 105 and 105ª with lugs for engagement with the tops of the lasts, as explained of the plates 88, the sections 105 and 105ª being pivotally connected together by a pin 106, the section 105 containing a recess 107 into which a lug 108 on the section 105ª extends, the lug 108 being of less width than the recess 107, whereby the rotary movement of the sections 105 and 105ª, relative to each other, is limited. The provision of the sectional clamps, as described, is of great advantage where the lasts vary somewhat, as it causes the clamp to have a four-point contact with the last under all conditions.

While I have illustrated and described a particular embodiment of my invention and its use in the machine of a certain construction, I do not wish to be understood as intending to limit it to such form of construction or to its use in the machine illustrated, as it may be used in other connections and its form may be variously modified and altered without departing from the spirit of the invention, it being my intention to claim my invention as broadly and fully as the prior state of the art will permit.

What I claim as new and desire to secure by Letters Patent is:—

1. A clamping member formed of sections each carrying a plurality of contact points, said sections being pivotally connected together by means extending transversely of the joint between said sections and transversely of thrust of the clamp.

2. A work-clamping device comprising a threaded rod, a sleeve threaded thereon, lugs on said sleeve, a plate containing an opening adapted to be applied to said rod and engage a piece of work, said plate extending at said opening over said rod, and means on said plate coöperating with said lugs, when the sleeve is rotated, to force said plate toward the work, said opening being so shaped as to permit said plate to be withdrawn from said rod over said sleeve, when said plate is rotated to register said opening with said lugs, said sleeve being provided with a section beyond said lug of such cross-section that when said plate is withdrawn from operative position and adjusted into registration with said section, the said sleeve may be rotated for adjustment without rotating said plate.

3. A work-clamping device comprising a member carrying lugs, and having its ends beyond said lugs expanded, a plate adapted to engage a piece of work and containing an elongated opening of a shape and size permitting said member and lugs to pass therethrough in assembling said plate and member, the portion of said member between said lugs and said expanded end being of less cross-sectional width than the short dimension of said opening, and the long cross-sectional dimension of said expanded portion being greater than the long dimension of said opening, and means on said plate coöperating with said lugs when the latter are rotated to force said plate toward the work.

4. A work-clamping device comprising a member carrying lugs, a plate adapted to engage a piece of work and containing an opening through which said member extends, means on said plate coöperating with said lugs, when the latter are turned, to force said plate toward the work, and a spring on said member beyond the plate-engaging surfaces of said lugs operating to releasably retain said plate on said member when said plate is moved out of work-clamping position into a position in which it extends beyond said surfaces of said lugs.

5. A work-clamping device comprising a threaded rod, a sleeve threaded thereon, lugs on said sleeve, a plate containing an opening, adapted to be applied to said rod and engage a piece of work, said plate extending at said opening over said rod, and means on said plate coöperating with said lugs, when the latter are rotated, to force said plate toward the work, said opening being so shaped as to permit said plate to be withdrawn from said rod, over said sleeve, when said plate is rotated to register said opening with said lugs.

6. A work-clamping device comprising a threaded rod, a sleeve threaded thereon, lugs on said sleeve, a plate containing an opening, adapted to be applied to said rod and engage a piece of work, said rod extending through the opening in said plate, and means on said plate coöperating with said lugs, when the latter are rotated, to force said plate toward the work.

7. A work-clamping device comprising a threaded rod, a sleeve threaded thereon, lugs on said sleeve, a plate containing an opening, adapted to be applied to said rod and engage a piece of work, said rod extending through said opening in said plate, means on said plate coöperating with said lugs, when the latter are rotated, to force said plate toward the work, and a spring on said threaded sleeve operating to releasably retain said plate on said sleeve.

8. The combination with cutting-mechanism, of work-holding means comprising a member, members provided with surfaces for engaging the work supported on said member, and adjustable toward and away from each other, means operating upon adjusting said members toward each other to cause said work-engaging surfaces to move toward said cutting-mechanism and when adjusted in the opposite direction to move away from said mechanism, and means for releasably securing the work on said first-named member.

9. Work-holding means comprising a member having inclined guide-surfaces, members provided with surfaces for engaging the work supported on said guide-surfaces and adjustable toward and away from each other, and means for releasably securing the work on said first-named member.

10. Work-holding means comprising a member having inclined converging guide-surfaces, members provided with surfaces for engaging the work, supported on said guide-surfaces and adjustable toward and away from each other, and means for releasably securing the work on said first-named member.

11. Work-holding means comprising a yoke-shaped member trunnioned at its arms, members provided with surfaces for engaging the work, supported on said member within the confines of the latter, and adjustable toward and away from each other, means operating upon adjusting said members toward each other to cause said work-engaging surfaces to move toward the axial line of said trunnions and when adjusted in the opposite direction to move away from said line, and means for releasably securing the work on said first-named member.

12. Work-holding means comprising a member, pairs of members on said member arranged in spaced relation and supported to be moved lengthwise, the members of each pair flatwise opposing each other in parallel relation and relatively adjustable in parallel planes, and means carried by said pairs of members for engaging the edges of the work at the opposite ends of the latter.

13. Work-holding means comprising a member, bars supported on said member and adjustable toward and away from each other thereon, pairs of members extending lengthwise of said first named member and carried by said bars, said pairs of members arranged in spaced relation, and the members of each pair flatwise opposing each other in parallel relation and relatively adjustable in parallel planes, and means carried by said pairs of members for engaging the edges of the work at the opposite ends of the latter.

14. Work-holding means comprising a member, pairs of bars on said member arranged in spaced relation, the members of each pair flatwise opposing each other in parallel relation and relatively adjustable in parallel planes, and shoulders on said pairs for clamping a plurality of pieces of work to said member, a plurality of said shoulders being provided on each bar and the shoulders on one bar of each pair alternating with the shoulders on the other bar of each pair.

15. Work-holding means comprising a member, bars secured to said member in spaced relation and adjustable toward and away from each other, said bars containing channels opening through corresponding faces of the bars, a pair of longitudinally-shiftable bars confined in each channel with the bars of each pair flatwise opposing each other in parallel relation, and shoulders on said bars for clamping the work at its opposite ends to said member.

16. Work-holding means comprising a member, pairs of bars on said member arranged in spaced relation, the members of each pair flatwise opposing each other in parallel relation and relatively adjustable in parallel planes, shoulders on said bars for clamping a plurality of pieces of work to said member, a plurality of said shoulders being provided on each bar and the shoulders on one bar of each pair alternating with the shoulders on the other bar of each pair, and bearing surfaces on said bars between said shoulders.

17. Work-holding means comprising a member, pairs of members on said member arranged in spaced relation, the members of each pair being relatively adjustable, and shoulders on said last named members between which the work at opposite ends is clamped, the shoulders on adjacent members alternating, and bearing surfaces on said members extending above the latter between said shoulders.

18. Work-holding means comprising a member, members on said member adjustable relative to each other and carrying elements for clamping pieces of work to said member, the clamping elements on one of said members alternating with the clamping elements on the other of said members, the clamping elements on one of said members being adjustable independently of each other and independently of the member carrying them.

19. In work-holding means, the combination of a member containing in a face thereof, channels spaced apart, and a pair of flatwise opposed bars confined in each channel to be shifted longitudinally therein in opposite directions, said bars carrying work-engaging shoulders and containing key-engaging portions for shifting them.

20. In work-holding means, the combination of a member containing in a face thereof, channels spaced apart, and a pair of flatwise opposed bars confined in each channel to be shifted longitudinally therein in opposite directions, said bars carrying work-engaging shoulders and containing key-engaging notches for shifting them.

21. Work-holding means comprising a member presenting converging surfaces, members extending lengthwise of said first-named member and bearing against said converging surfaces and adjustable toward and away from each other thereon, and means on said last-named members and adjustable lengthwise of the latter, for clamping the work in place.

22. Work-holding means including a member for engaging the side of a last or pattern and a bearing-block having its upper surface rounded with the high point on said surface closely adjacent to said member.

23. Work-holding means including a member for engaging the side of a last or pattern and a bearing-block having its upper surface of spherical contour with the high point on said surface closely adjacent to said member.

24. Work-holding means including a member for engaging the side of a last or pattern and a bearing-block having its upper surface rounded with the high point on said surface closely adjacent to said member, said bearing-block being lower at one edge than at its opposite edge.

25. Work-holding means including a member for engaging the side of a last or pattern and a bearing-block having its upper surface of spherical contour with the high point on said surface closely adjacent to said member, said bearing-block being lower at one edge than at its opposite edge.

26. Work-holding means for supporting a last to be operated on, comprising a supporting member consisting of surfaces spaced apart and between which a last positioned on said member extends at its heel portion, said surfaces being inclined relative to the median line of the last and flaring outwardly in a direction away from, and at an angle to, that surface of said member opposed by the last when positioned thereon, means for engaging the last near its other end, and means for holding the last in position against said surfaces.

27. A work-clamping device comprising a member carrying lugs, and having its ends beyond said lugs expanded, a plate adapted to engage a piece of work and containing an elongated opening of a shape and size permitting said member and lugs to pass therethrough in assembling said plate and member, the portion of said member between said lugs and said expanded end being of less cross-sectional width than the short dimension of said opening, and the long cross-sectional dimension of said expanded portion being greater than the long dimension of said opening, a spring on said expanded portion adapted to engage said plate when the latter is adjusted to a position in which it surrounds said expanded portion for releasably holding said plate on said expanded portion, and means on said plate coöperating with said lugs when the latter are rotated to force said plate toward the work.

ARTHUR B. NORRIS.

In presence of—
RAYMOND H. ARNOT,
W. EUGENE CROSBY.